United States Patent
Udo et al.

(10) Patent No.: US 8,520,338 B2
(45) Date of Patent: Aug. 27, 2013

(54) MAGNETIC RECORDING HEAD, METHOD OF MANUFACTURING THE SAME, AND MAGNETIC DISK UNIT

(75) Inventors: Yuta Udo, Odawara (JP); Mikito Sugiyama, Odawara (JP); Masato Shiimoto, Odawara (JP); Nobuo Yoshida, Hiratsuka (JP); Kenji Sugiura, Odawara (JP); Masashi Hattori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/312,413

(22) Filed: Dec. 6, 2011

(65) Prior Publication Data

US 2012/0147502 A1    Jun. 14, 2012

(30) Foreign Application Priority Data

Dec. 8, 2010  (JP) ................. 2010-273580

(51) Int. Cl.
*G11B 5/127*  (2006.01)
*G11B 5/187*  (2006.01)

(52) U.S. Cl.
USPC ............. 360/128; 360/125.3; 360/125.71; 216/22

(58) Field of Classification Search
USPC ............. 360/128, 125.3, 125.71; 216/22; 29/603.15, 603.18
See application file for complete search history.

(56) References Cited

U.S. PATENT DOCUMENTS

| | | | |
|---|---|---|---|
| 6,330,743 B1 | 12/2001 | Iijima et al. | |
| 8,320,079 B2* | 11/2012 | Iwasaki et al. | 360/128 |
| 2009/0310244 A1* | 12/2009 | Shimazawa et al. | 360/75 |
| 2010/0007996 A1* | 1/2010 | Iwasaki et al. | 360/324 |
| 2011/0090603 A1 | 4/2011 | Bai | |
| 2011/0128652 A1* | 6/2011 | Taguchi et al. | 360/123.12 |
| 2011/0141629 A1* | 6/2011 | Braganca et al. | 360/313 |
| 2011/0205667 A1* | 8/2011 | Yamada et al. | 360/122 |

FOREIGN PATENT DOCUMENTS

| | | |
|---|---|---|
| JP | 06-243527 A | 9/1994 |
| JP | 06-243529 A | 9/1994 |
| JP | 11-161915 A | 6/1999 |
| JP | 2010-003351 A | 1/2010 |
| JP | 2011-090767 A | 5/2011 |

OTHER PUBLICATIONS

Nozaki et al, Microwave-assisted magnetization reversal in a Co/Pd multilayer with perpendicular magnetic anisotropy, Applied Physics Letters, 2009, 95-082505, Department of Electronics, Kyushu University, Fukuoka, Japan.

* cited by examiner

*Primary Examiner* — Will J Klimowicz
(74) *Attorney, Agent, or Firm* — Volpe and Koenig, P.C.

(57) ABSTRACT

Minute elements are formed while a photo deviation is suppressed between a spin torque oscillator and a main pole and damage is prevented on the ends of the spin torque oscillator in microwave-assisted recording. A magnetic recording head used for microwave-assisted recording includes: a main pole; a spin torque oscillator that is disposed on the main pole and includes a magnetization high-speed rotation layer for rotating magnetization at a high speed by a spin torque; a protective film that is disposed in the track width direction of the spin torque oscillator; an insulating film formed over the wall surfaces of the main pole and the wall surfaces of the protective film; and a magnetic film formed on the insulating film so as to cover at least the main pole.

20 Claims, 13 Drawing Sheets a b c g h i a b a b g h

MAGNETIC RECORDING HEAD, METHOD OF MANUFACTURING THE SAME, AND MAGNETIC DISK UNIT

CLAIM OF PRIORITY

The present application claims priority from Japanese applications JP 2010-273580 filed on Dec. 8, 2010 the content of which is hereby incorporated by reference into this application.

BACKGROUND OF THE INVENTION

1. Field of the Invention

The present invention relates to a magnetic recording head, a method of manufacturing the same, and a magnetic disk unit, and particularly relates to a magnetic recording head having a spin torque oscillator of a microwave-assisted magnetic recording head system, a method of manufacturing the same, and a magnetic disk unit including the magnetic recording head.

2. Description of the Related Art

In recent years, magnetic recording heads supporting higher recording densities in hard disk drives (HDDs) have been reduced in size, leading to technical difficulty in obtaining a sufficient magnetic field for flux reversal. As a solution to this problem, a technique called energy-assisted recording has received attention. In energy-assisted recording, some energy is applied to a medium to reduce a necessary magnetic field for flux reversal, so that a magnetic signal can be written to a recording medium that is unrecordable under normal conditions. Thus, higher recording capability and smaller recording regions can be achieved. Energy used for assisted recording is Joule heat generated by a laser (thermally assisted recording). Such recording is a representative energy-assisted recording mode.

Moreover, in a known technique, a high-frequency field is used as energy for assisting recording. This technique is a promising technique of energy-assisted recording. For example, in Japanese Patent Laid-Open No. 6-243527 have proposed a microwave-assisted magnetic recording system that facilitates writing by applying an assist magnetic field of GHz microwaves to a recording medium. In 'Microwave Assisted Magnetic Recording,' The Magnetic Recording Conference (TMRC) 2007 Paper B6 (2007), J. G. Zhu and X. Zhu, a technique is reported in which a magnetization high-speed rotor (Field Generation Layer: FGL) for high-speed magnetization rotation by a spin torque is disposed near a magnetic recording medium next to the main pole of a perpendicular magnetic head to generate microwaves, so that information is recorded on a magnetic recording medium having large magnetic anisotropy. Furthermore, in "Microwave-assisted magnetization reversal in a Co/Pd multilayer with perpendicular magnetic anisotropy. Applied Physics Letters. 2009, vol. 95, p. 082505-1-3.", Nozaki,Y. et al., a flux reversal assist is reported that uses a Co/Pd artificial lattice film having perpendicular magnetic anisotropy. A material used in this technique has also been studied as a medium material for perpendicular magnetic recording, which proves that microwave-assisted magnetic recording is effectively applicable to a perpendicular magnetic recording medium.

As reported above, microwave-assisted magnetic recording with spin torque oscillators has been currently promoted.

In microwave-assisted magnetic recording, information is recorded on a medium by combining a recording magnetic field generated from a main pole and an assist magnetic field generated from a spin torque oscillator, so that a track width written on the medium depends on the width of an FGL layer in the spin torque oscillator. Hence, it can be said that micro fabrication of spin torque oscillators is a significant technique for improving a recording density.

Micromachining of spin torque oscillators has, however, the following technical problems:

A first problem is an offset (misalignment) between a main pole and a spin torque oscillator. Machining of a spin torque oscillator requires the formation of a Stripe Height direction and a track width direction. In such machining, etching such as milling and techniques such as photolithography are used. Photolithography has been recently developed in which a fine pattern of several tens nm can be exposed with a photo deviation of ±20 nm. However, it is virtually impossible to eliminate such a photo deviation, so that a fine pattern is considerably affected by a photo deviation. Also in machining of a spin torque oscillator, such a photo deviation is not negligible in the formation of a spin torque oscillator having a width of several tens nm on a main pole that is a pattern having a width of several tens nm.

Even in the case where the deviation of a spin torque oscillator is only 10 nm from the center of a main pole width, an assist effect is considerably degraded. Since a trailing shield and a main pole are used as electrodes, a large deviation of the spin torque oscillator causes a displacement of a contact, so that an electrical resistance may increase. In other words, unless the influence of a photo deviation is eliminated in the formation of the spin torque oscillator, it is quite difficult to stably obtain a desired shape.

In the age of in-plane magnetic heads, self alignment was generally used to align the widths of an upper magnetic pole and a lower magnetic pole. In the technique of Japanese Patent Laid-Open No. 11-161915, when a lower magnetic pole is trimmed to an upper magnetic pole, the widths of the magnetic poles can be aligned by a protective film provided on the side wall of the upper magnetic pole. In the case where a main pole and a spin torque oscillator are formed by self alignment in microwave-assisted recording, the upper magnetic pole and the lower magnetic pole of an in-plane head are covered only with an insulating film, whereas the spin torque oscillator and the main pole are covered with a magnetic film. Because of this difference, self alignment is not similarly effective.

A second problem is etching damage on a spin torque oscillator including a laminated film. The problem of an offset may be solved by collectively etching (self alignment) a main pole and a spin torque oscillator by techniques such as milling with a single etching mask. In the case of collective formation by physical etching such as milling, however, an etched material of the main pole may adhere to the end of the spin torque oscillator. Moreover, etching damage or edge roughness may occur on the spin torque oscillator. Thus, only such collective formation may cause damage on the spin torque oscillator.

A third problem is the locations of side shields.

In perpendicular magnetic recording, a phenomenon called "blurred writing" has been a problem caused by a spatial expansion of a recording magnetic field generated from a main pole. As an effective solution, a magnetic material shield disposed around a main pole is known. Also in the case of a spin torque oscillator, it is effective to dispose side shields around the spin torque oscillator so as to concentrate an assist magnetic field around a desired recording bit. A gap film is disposed between the shield and the main pole or the spin torque oscillator to reduce magnetic interaction. The spacing (corresponding to a gap thickness) between the shield and the main pole or the spin torque oscillator is an important controllable factor for the performance of the shield, the main pole, and the spin torque oscillator. This is because in the case of an extremely thin gap film, a generated recording magnetic field or assist magnetic field is absorbed by the shield, precluding the generation of a desired magnetic field on a magnetic recording medium. In the case of an extremely thick gap film, the effect of suppressing the spatial expansion of a recording magnetic field or assist magnetic field may be lessened. Furthermore, it is necessary to consider the influence of a change of shield magnetization, which may be changed by a signal magnetic field from a magnetic recording medium and a recording magnetic field from the main pole. In the case of a spin torque oscillator having an extremely thin gap film, a shield magnetization process may adversely affect the oscillation characteristics of the spin torque oscillator, degrading a desired recording assist effect.

In the technique of Japanese Patent Laid-Open No. 2010-3351, a magnetic film is provided between a spin torque oscillator and a third magnetic layer. It is considered that the magnetic film does not prevent blurred writing unlike side shields but acts as a bypass for dispersing magnetic flux passing through the spin torque oscillator from a main pole. Furthermore, the widths of the main pole and the spin torque oscillator are not described in this technique and thus the problem of this technique is different from the third problem.

SUMMARY OF THE INVENTION

The present invention has been made to solve at least one of the three problems.

Preferably, a magnetic recording head according to the present invention is a magnetic recording head used for microwave-assisted recording, the magnetic recording head including: a main pole; a spin torque oscillator that is disposed on the main pole and includes a magnetization high-speed rotation layer for rotating magnetization at a high speed by a spin torque; a protective film that is disposed in the track width direction of the spin torque oscillator; an insulating film formed over the wall surfaces of the main pole and the wall surfaces of the protective film; and a magnetic film formed on the insulating film so as to cover at least the main pole.

According to a preferred example, in the magnetic recording head, the magnetic film is formed on the insulating film so as to cover the protective film formed on the spin torque oscillator and the main pole.

Preferably, in the magnetic recording head, the protective film and the insulating film around the spin torque oscillator have a thickness (gap thickness) larger than a thickness (gap thickness) of the insulating film formed around the main pole.

Preferably, in the magnetic recording head, the thickness of the protective film and the insulating film around the spin torque oscillator is at least 5 nm.

Preferably, in the magnetic recording head, the spin torque oscillator includes an FGL layer having a width of TWfgl in a track direction, the protective film disposed in the track direction of the FGL layer has a total width of TWins on both sides of the protective film, the main pole directly under the protective film has a width of TWmp in the track direction, the FGL layer and the magnetic film are separated by a distance of GAPfgl in the track direction, a main pole end directly under the protective film and the magnetic film are separated by a distance of GAPmp in the track direction, the total width of TWfgl and TWins has a center position of Csw, TWmp has a center position of Cm, and in this case, Csw and Cm are located substantially on the same line in the thickness direction (main pole–FGL layer direction) and a relationship of GAPfgl>GAPmp is satisfied.

Preferably, in the magnetic recording head, in the case where the magnetic film includes a side shield magnetic film formed in the track direction on the sides of the main pole and the spin torque oscillator and a trailing shield magnetic film formed on the spin torque oscillator, the side shield magnetic film has an end that is substantially aligned with the end of the main pole in the thickness direction.

Preferably, in the magnetic recording head, the protective film laterally formed in the track width direction of the spin torque oscillator has a laterally asymmetric thickness in the track width direction.

Preferably, in the magnetic recording head, the protective film disposed in the track width direction of the spin torque oscillator includes one of a single layer film and a laminated film that are made of materials such as Al2O3, SiO2, and SiN.

Preferably, a method of manufacturing a magnetic recording head according to the present invention includes: a track forming step including: forming a spin torque oscillator on a main pole; etching the spin torque oscillator with an etching mask formed for track formation on the spin torque oscillator; forming a protective film protecting the ends of the spin torque oscillator while keeping the etching mask; etching the main pole by using the etching mask for track formation and the protective film serving as an etching mask; forming an insulating film that insulates the main pole and the spin torque oscillator; and forming a magnetic film by applying a coating film around the insulting film; a Stripe Height forming step including: forming an etching mask for Stripe Height formation to etch the spin torque oscillator; filling an etched part with an insulating film; and removing the mask used for etching; and forming a magnetic film/upper electrode film for the spin torque oscillator by applying a coating to the spin torque oscillator by plating after the track formation and the Stripe Height formation.

Preferably, a magnetic disk unit according to the present invention that writes information on a rotating magnetic disk while moving a magnetic head in a predetermined direction, the magnetic head being used for microwave-assisted recording, the magnetic recording head including: a main pole; a spin torque oscillator that is disposed on the main pole and includes a magnetization high-speed rotation layer for rotating magnetization at a high speed by a spin torque; a protective film that is disposed in the track width direction of the spin torque oscillator; an insulating film formed over the wall surfaces of the main pole and the wall surfaces of the protective film; and a magnetic film formed on the insulating film so as to cover at least the main pole.

The present invention can achieve the following effects:

The main pole and the spin torque oscillator are formed by self alignment, thereby eliminating an offset. Moreover, the provision of the protective film can suppress milling damage on the ends of the spin torque oscillator. Furthermore, the thickness of the protective film is adjusted, so that a distance between the spin torque oscillator and the side shield can be adjusted to any distance.

By virtue of these effects, a magnetic recording head including a spin torque oscillator in microwave-assisted recording can be stably formed.

DETAILED DESCRIPTION OF THE INVENTION

According to embodiments of the present invention, minute elements are formed while a photo deviation is suppressed between a spin torque oscillator and a main pole and damage is prevented on the ends of the spin torque oscillator in microwave-assisted recording. The embodiments will be described below with reference to the accompanying drawings.

First Embodiment

Figure 1:
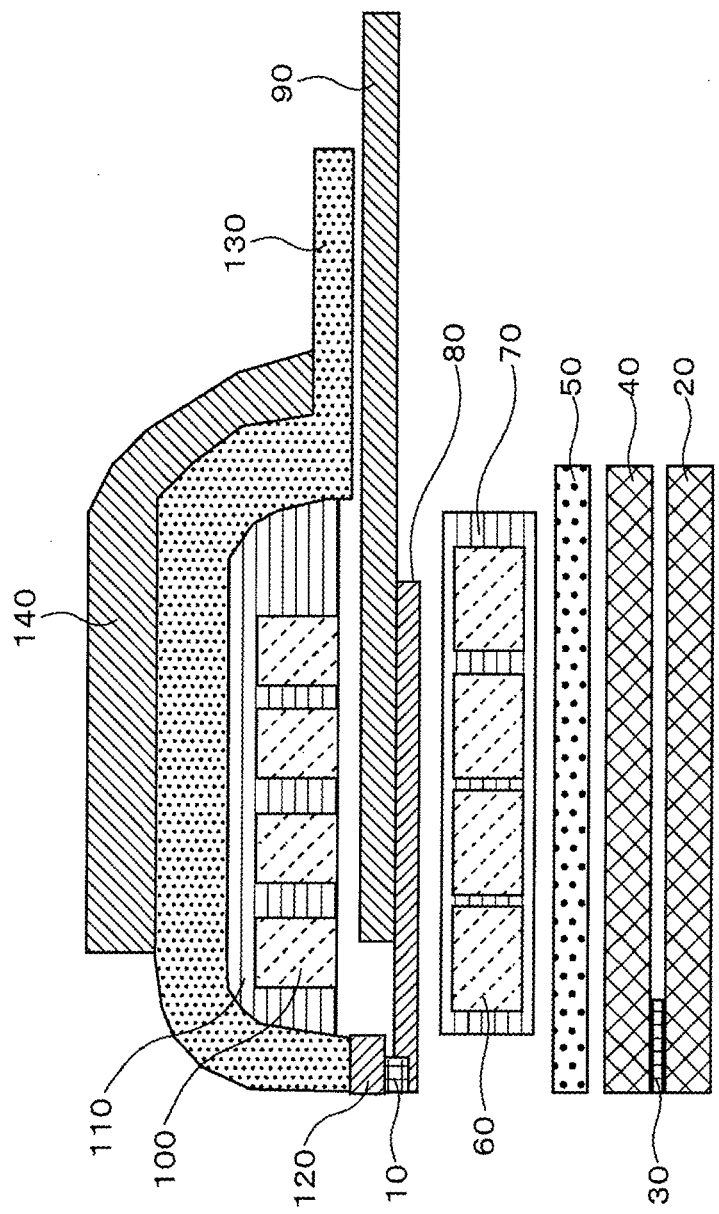
FIG. 1 is a cross-sectional view illustrating a magnetic recording head including a spin torque oscillator according to an embodiment of the present invention.

FIG. 1 illustrates the structure of a magnetic recording head including a spin torque oscillator.

In FIG. 1, reference numeral 10 denotes a spin torque oscillator, reference numeral 20 denotes a lower shield, reference numeral 30 denotes a read sensor, reference numeral 40 denotes an upper shield, reference numeral 50 denotes a lower magnetic pole, reference numeral 60 denotes lower coils, reference numeral 70 denotes a lower-coil insulating film, reference numeral 80 denotes a main pole, reference numeral 90 denotes a sub magnetic pole/oscillator lower electrode, reference numeral 100 denotes upper coils, reference numeral 110 denotes an upper-coil insulating film, reference numeral 120 denotes a trailing shield, and reference numeral 130 denotes an upper magnetic pole/oscillator upper electrode.

The spin torque oscillator 10 is disposed between the main pole 80 and the trailing shield 120. In this structure, the sub magnetic pole 90 connected to an extended part from the main pole 80 and the upper magnetic pole 130 connected and extended from the trailing shield 120 are used as electrodes for supplying current to the spin torque oscillator.

Figure 2:
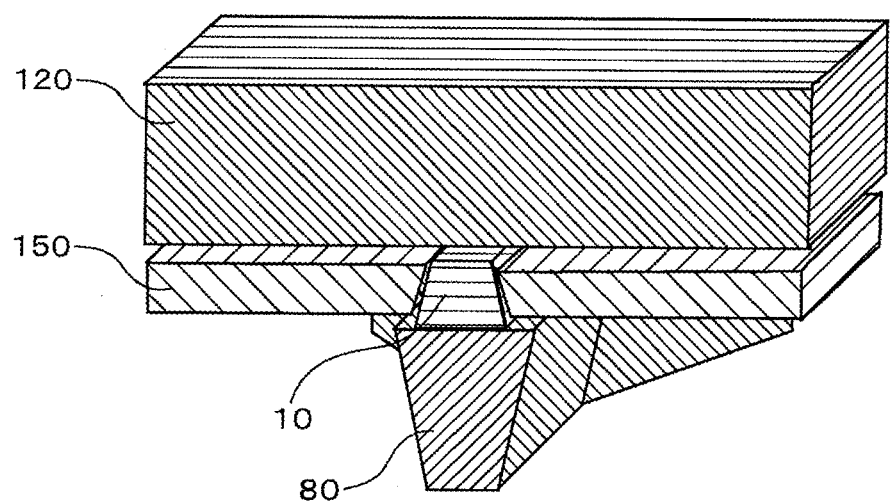
FIG. 2 is a cross-sectional view illustrating a part around the spin torque oscillator in a track direction according to the embodiment.

FIG. 2 shows an example of the structure of the spin torque oscillator 10, which is a part for actual recording in microwave assisted magnetic recording. A magnetic film is provided around the main pole 80 or around the main pole and the spin torque oscillator 10. A side shield 150 of a magnetic film is formed on each side of the spin torque oscillator 10. The spin torque oscillator 10 is nearly trapezoidal or rectangular in cross section. The main pole 80 under the spin torque oscillator 10 is shaped like a reversed trapezoid or a rectangle.

Figure 3:
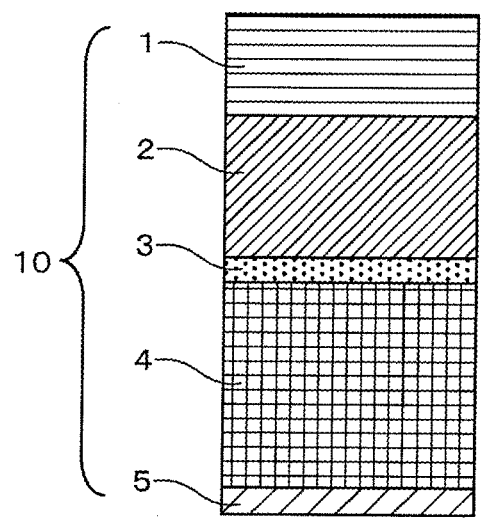
FIG. 3 is a cross-sectional view illustrating the configuration of films in the spin torque oscillator according to the embodiment (example 1)

As illustrated in FIG. 3, the spin torque oscillator 10 typically includes a seed layer 5, a reference layer 4, an intermediate layer 3, an FGL layer 2, and a cap layer 1.

Figure 4:
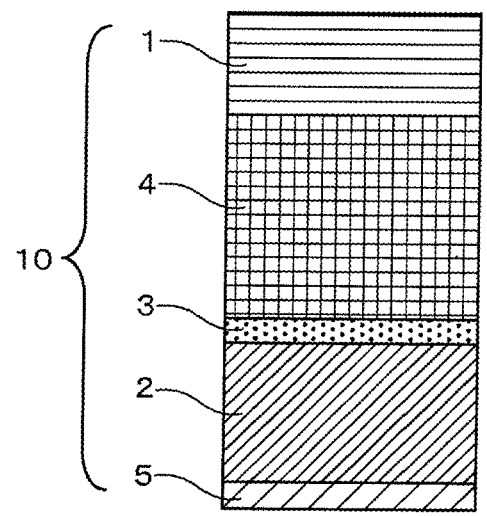
FIG. 4 is a cross-sectional view illustrating the configuration of the films in the spin torque oscillator according to the embodiment (example 2)

FIG. 4 illustrates another example of the films of the spin torque oscillator 10. In FIG. 4, the reference layer 4 and the FGL layer 2 are reversed (from the configuration of FIG. 3). In this configuration, the FGL layer that actually generates an assist magnetic field is closer to the main pole, so that an enhanced assist effect can be expected.

Referring to FIGS. 5A to 5D, the following will specifically describe a method of manufacturing the magnetic recording head according to the embodiment of the present invention. The method allows the main pole 80 and the spin torque oscillator 10 to be formed by self alignment, suppresses damage on the ends of the spin torque oscillator, and allows the side shield to be formed at an optimal location in the microwave-assisted magnetic recording head configured as described above.

First, materials such as NiFe and CoNiFe are applied by sputtering or plating to an insulating layer 160 formed on the lower coils 60, so that the layer of the main pole 80 is formed. Then, the layer of the spin torque oscillator 10 is formed on the main pole 80 [FIG. 5A(a)].

Figure 5A:
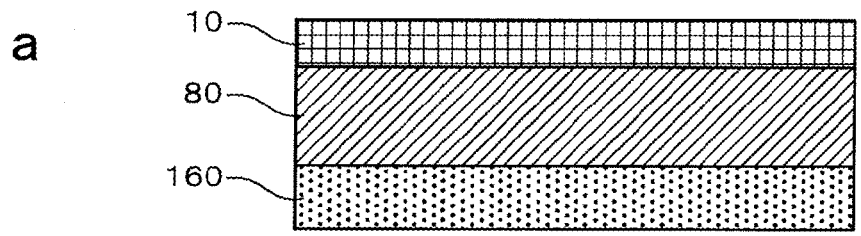
FIG. 5A is a cross-sectional view illustrating the manufacturing process of the magnetic recording head according to a first embodiment.
Figure 5A:
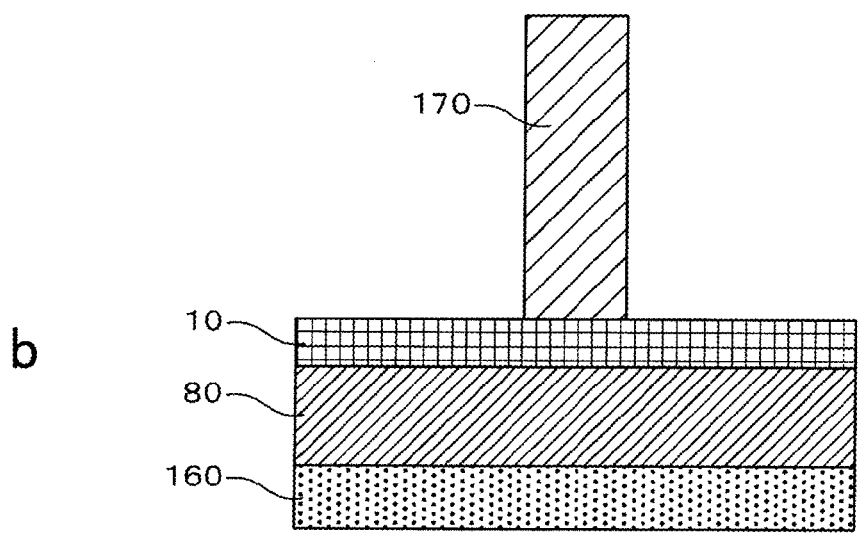
Figure 5A:
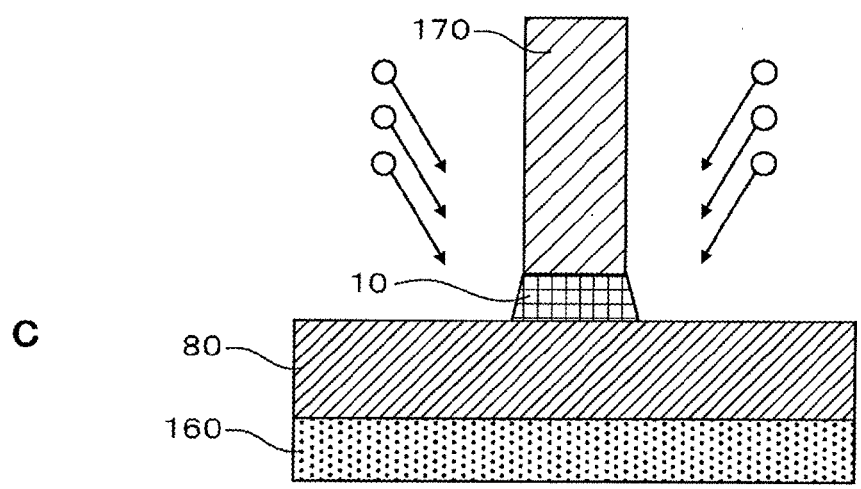

After that, an etching mask 170 made of a photoresist having relatively high etching resistance is formed on the layer of the spin torque oscillator 10 [FIG. 5A(b)], and then the layer of the spin torque oscillator 10 is etched with the photoresist serving as a first etching mask [FIG. 5A(c)].

Figure 5B:
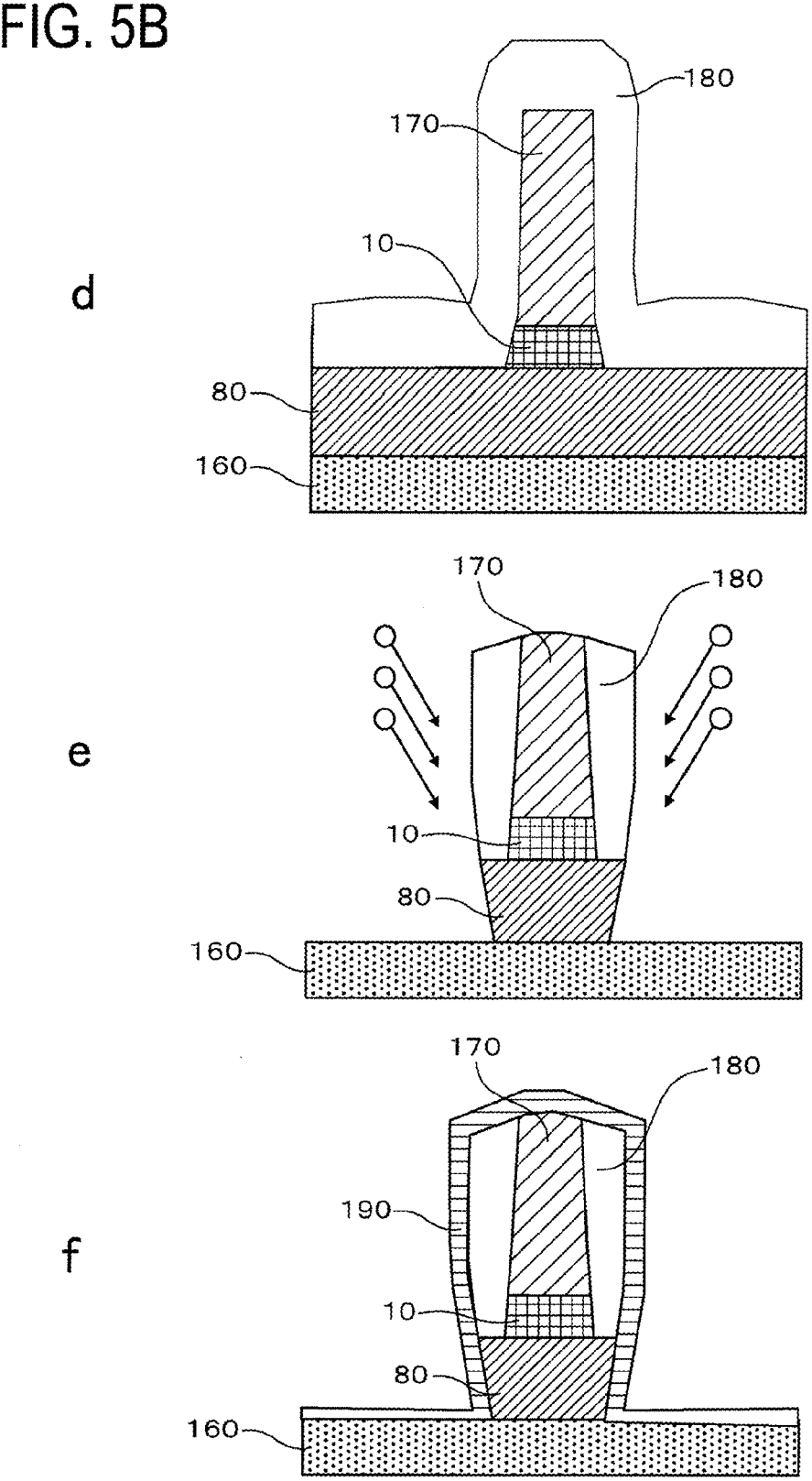
FIG. 5B is a cross-sectional view illustrating the manufacturing process of the magnetic recording head according to the first embodiment.

After the etching of the spin torque oscillator 10, a protective film/second etching mask 180 having any thickness is formed to protect the ends of the spin torque oscillator [FIG. 5B(d)]. The etching mask 180 is made of insulating materials such as Al2O3, SiO2, and SiN that are resistant to etching. The main pole 80 is etched by using the protective film/second etching mask 180 as an etching mask [FIG. 5B(e)]. After that, the ends of the main pole 80 and the spin torque oscillator 10 are covered with an insulating film 190 having any thickness [FIG. 5B(f)]. The insulating film 190 is made of materials such as Al2O3 and SiO2. In this configuration, any thickness can be set for the protective film/second etching mask 180 around the spin torque oscillator 10 and the insulating film 190 covering the second etching mask 180.

The thicknesses of the two films 180 and 190 are equivalent to the distance of a magnetic gap between the spin torque oscillator 10 and the side shield 150. The magnetic gap can be optionally adjusted concurrently with an adjustment of the thicknesses of the films. The thicknesses of the films can be adjusted by changing the film formation time.

The intensity of an assist magnetic field generated from the spin torque oscillator 10 is considerably lower than that of a recording magnetic field generated from the main pole 80. Hence, a gap thickness around the spin torque oscillator 10 is larger than that of the main pole 80, so that a recording magnetic field and an assist magnetic field are kept at proper intensities; meanwhile, the spatial expansion of the magnetic fields can be suppressed so as to enable desirable performance. Moreover, as described above, the effect of lessening the influence of a shield magnetization process on the oscillation characteristics of the spin torque oscillator 10 can be expected. The total thickness of the two gap thicknesses is preferably set at 5 nm or larger to achieve a proper recording assist effect. The above process is quite effective in view of mass production because the gap thicknesses around the main pole 80 and the spin torque oscillator 10 can be separately set and the side shields can be formed at the same time.

Figure 5C:
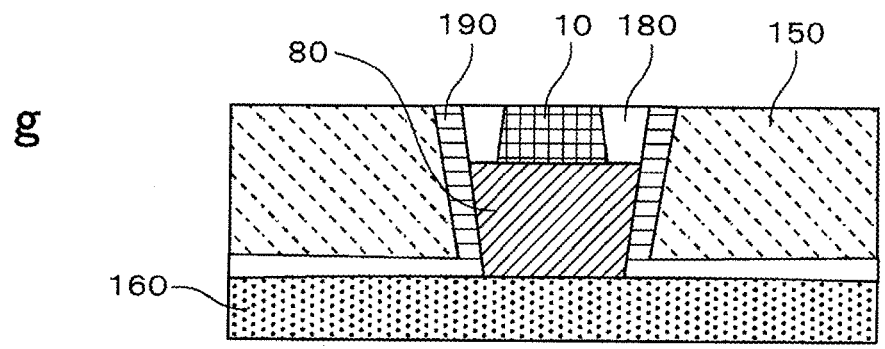
FIG. 5C is a cross-sectional view illustrating the manufacturing process of the magnetic recording head according to the first embodiment.
Figure 5C:
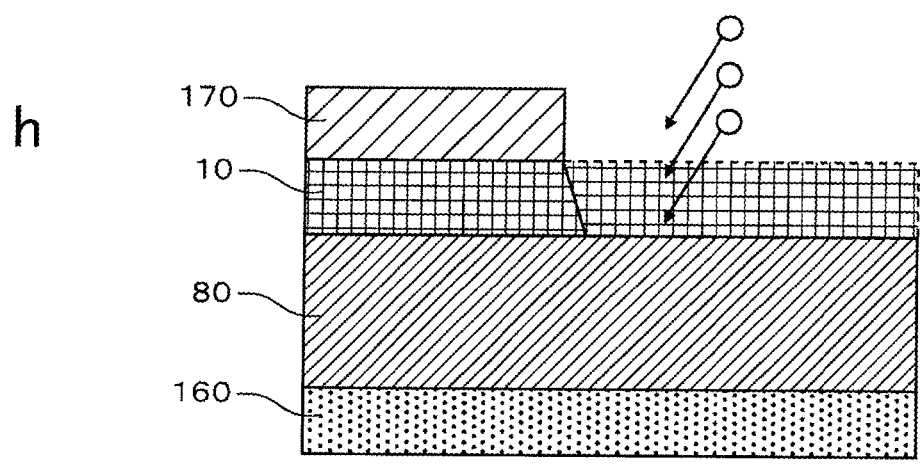
Figure 5C:
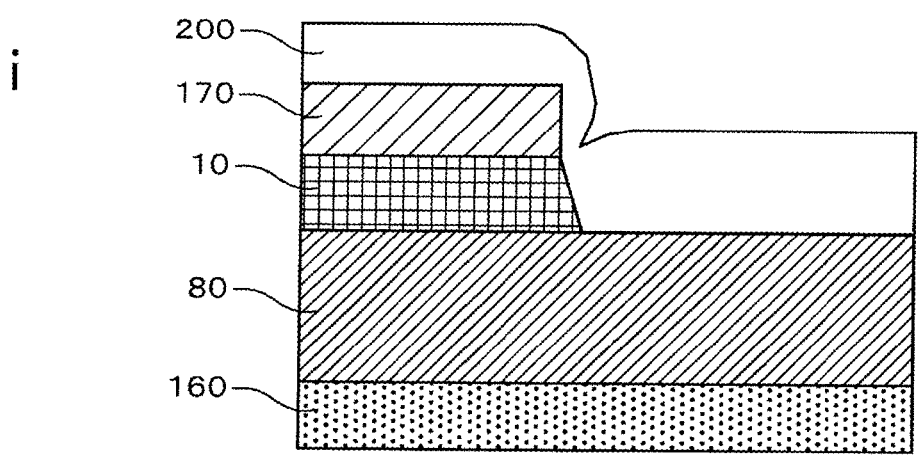

After the main pole 80 and the spin torque oscillator 10 are covered with the insulating film 190, the side shields 150 are formed on the ends of the main pole 80 and the spin torque oscillator 10 by plating or the like, and then the first etching mask 170 is peeled off, so that the structure in a track direction is formed [FIG. 5C(g)].

The following will discuss formation in a Stripe Height direction. In the formation in the Stripe Height direction of the spin torque oscillator 10, the main pole 80 is used as an electrode unlike in the formation in the track direction, so that etching is not performed. Thus, the etching mask 170 is formed to etch only the spin torque oscillator 10 [FIG. 5C(h)]. After that, the etched part is filled with an insulating film 200 made of materials such as Al2O3 and SiO2 [FIG. 5C(i)] and then the etching mask 170 is peeled off by techniques such as lift-off, so that the spin torque oscillator 10 is formed [FIG. 5D(j)].

Figure 5D:
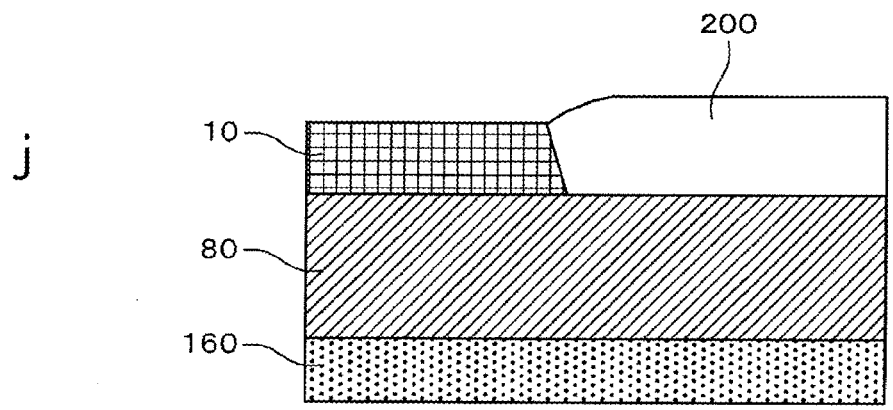
FIG. 5D is a cross-sectional view illustrating the manufacturing process of the magnetic recording head according to the first embodiment.
Figure 5D:
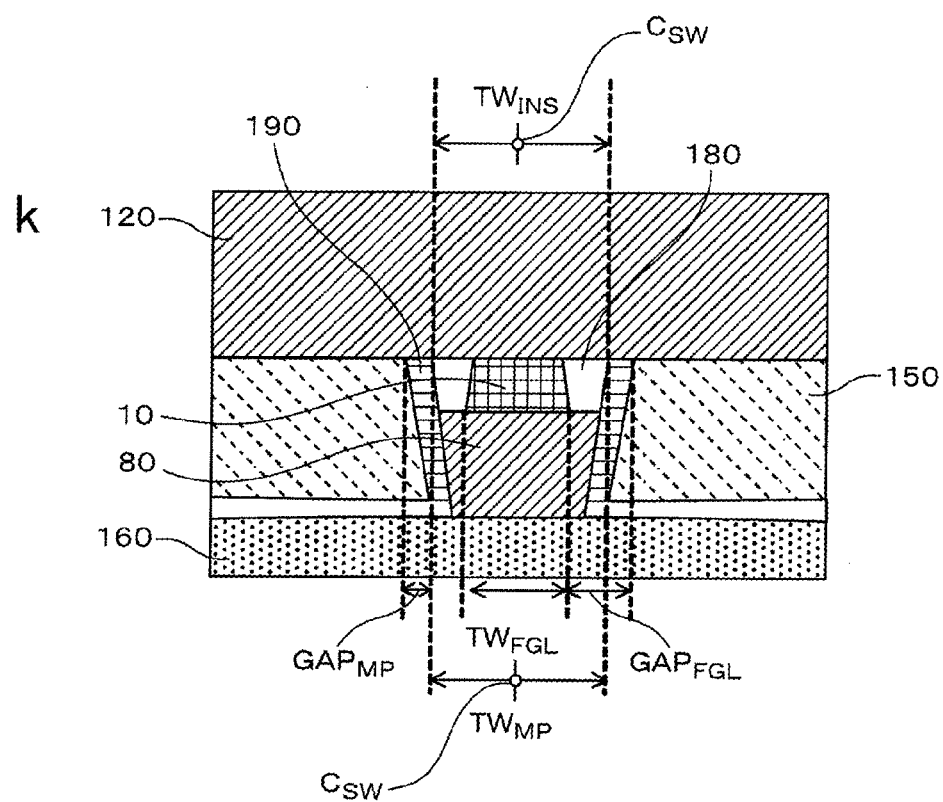

As described above, after the formation in the track direction and the Stripe Height direction, a coating is applied to the spin torque oscillator 10 by plating to form the trailing shield 120 [FIG. 5D(k)].

In FIG. 5D(k), the FGL layer in the spin torque oscillator 10 has a width of TWfgl in the track direction, the protective film 180 disposed in the track direction of the FGL layer has a total width of TWins on both sides of the protective film 180, the main pole 80 directly under the protective film has a width of TWmp in the track direction, the FGL layer and the magnetic film are separated by a distance of GAPfgl in the track direction, the end of the main pole directly under the protective film and the magnetic film 150 are separated by a distance GAPmp in the track direction, the total width of TWfgl and TWins has a center position of Csw, and TWmp has a center position of Cm. In this case, Csw and Cm are disposed substantially on the same line in the thickness direction (main pole–FGL layer direction) and the relationship of GAPfgl>GAPmp is satisfied.

The above process makes it possible to manufacture a recording head in which etching damage on the ends of the spin torque oscillator can be prevented and a magnetic gap from the shield can be optionally adjusted while the spin torque oscillator 10 and the main pole 80 are formed by self alignment.

Second Embodiment

Figure 6:
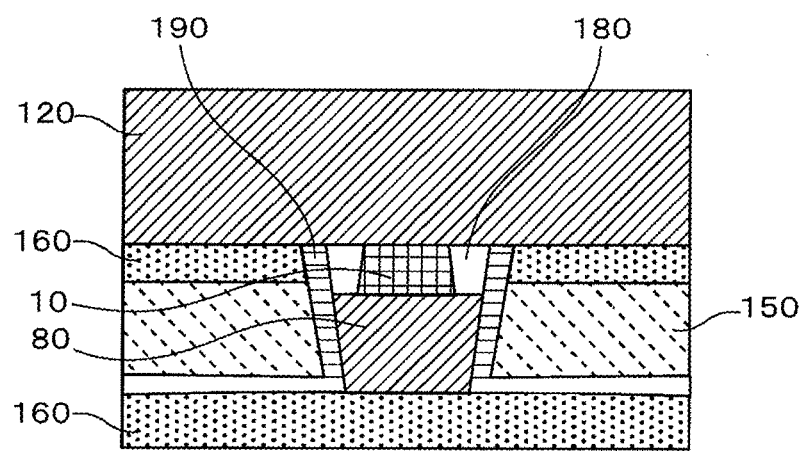
FIG. 6 is a cross-sectional view illustrating the manufacturing process of a magnetic recording head according to a second embodiment.

FIG. 6 is a cross-sectional view taken along a track direction to illustrate side shields covering only a main pole in a manufacturing process of a magnetic recording head.

The first embodiment describes an example in which the side shields are provided on the ends of the main pole and the spin torque oscillator. As described above, an assist magnetic field generated from the spin torque oscillator 10 has a low intensity. Depending upon the shape and materials of the spin torque oscillator 10 and a flowing current density required for spin torque oscillation, oscillation characteristics and the intensity of an assist magnetic field vary with an optimized design. In some cases, the spin torque oscillator without the side shields formed around it may achieve a satisfactory recording assist effect. In this case, in the manufacturing process of the first embodiment, the formation of the side shields is terminated on the top surface of the main pole and then the gap film is formed thereon.

Third Embodiment

FIGS. 7A to 7D are cross-sectional views taken along a track direction to illustrate formation on a main pole by a damascene process in a manufacturing process of a magnetic recording head.

In the first and second embodiments, the main pole 80 is formed by dry etching such as milling. The technique of forming the main pole 80 is not limited to dry etching such as milling. The main pole 80 may be formed by the damascene process and then various films may be formed thereon by the steps of the first embodiment. A specific example will be described below.

Figure 7A:
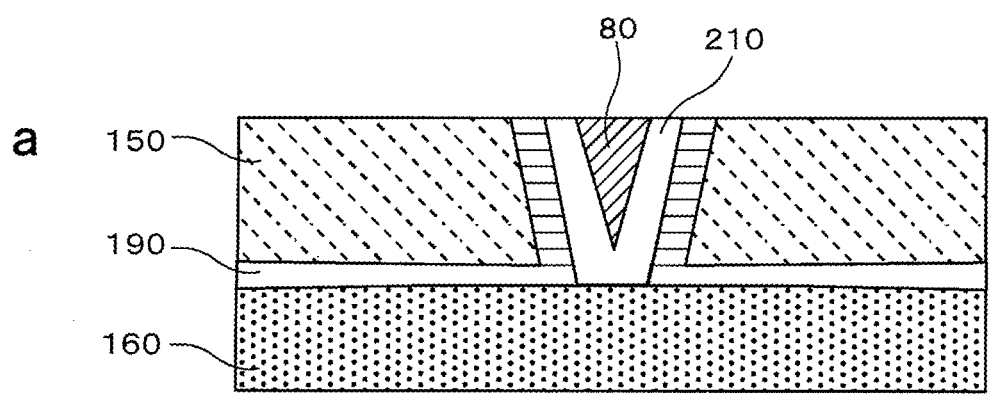
FIG. 7A is a cross-sectional view illustrating the manufacturing process of a magnetic recording head according to a third embodiment.
Figure 7A:
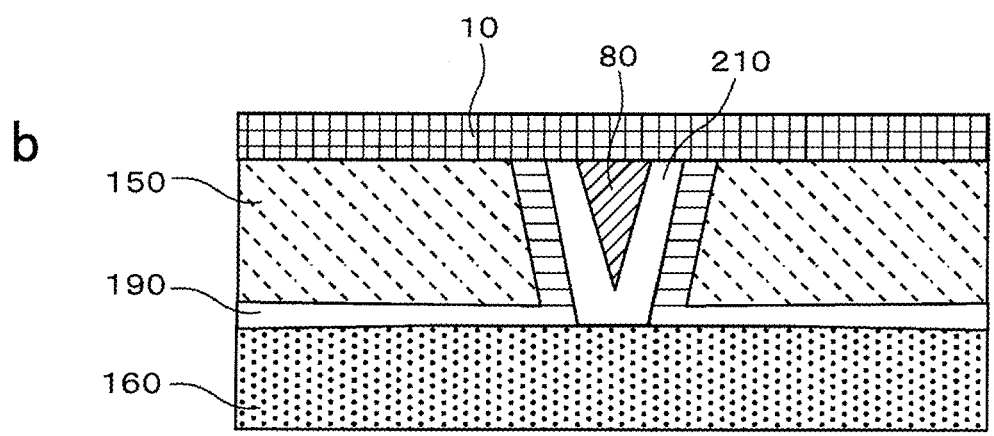
Figure 7B:
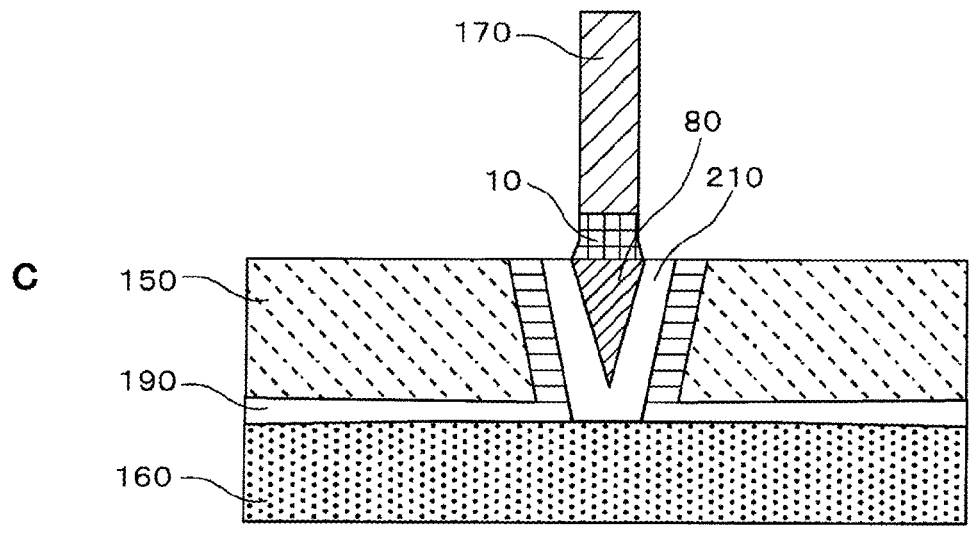
FIG. 7B is a cross-sectional view illustrating the manufacturing process of the magnetic recording head according to the third embodiment.
Figure 7B:
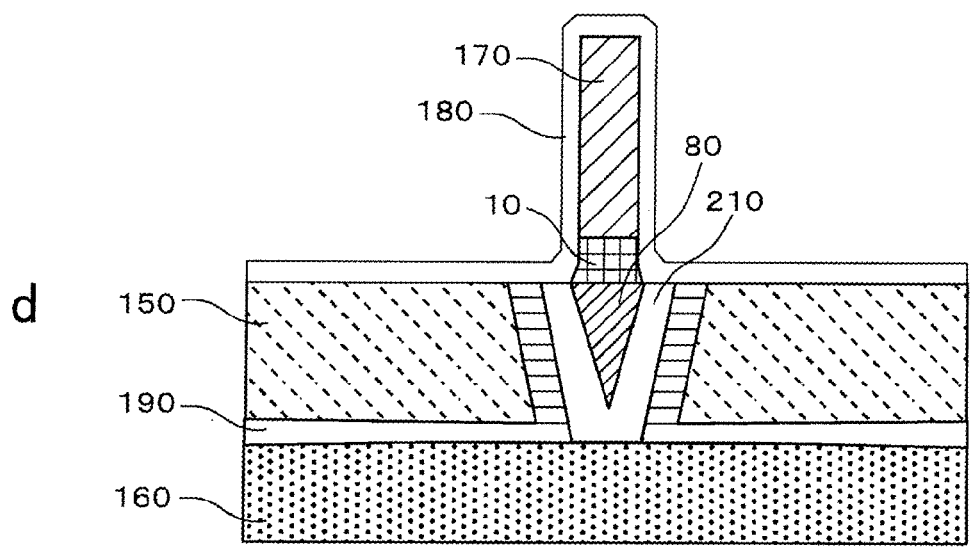
Figure 7C:
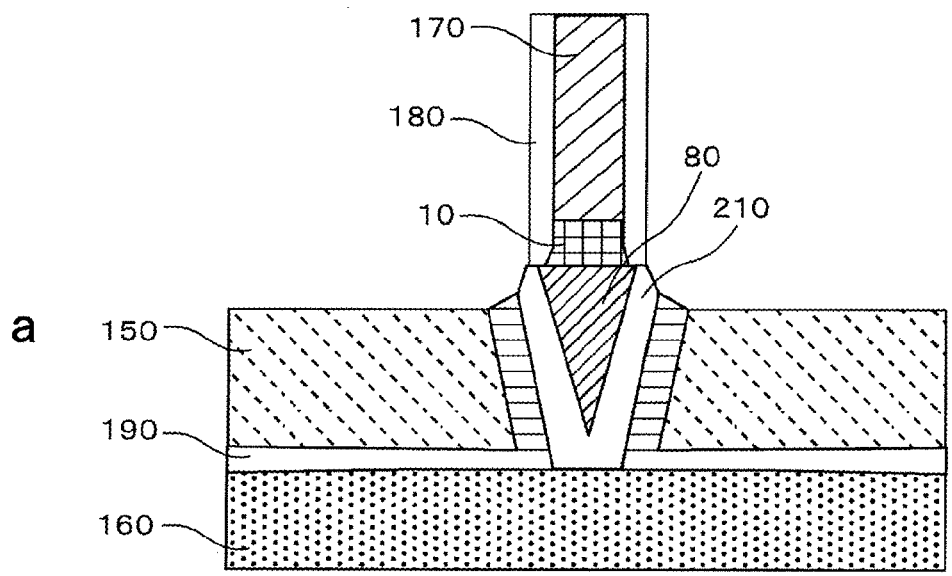
FIG. 7C is a cross-sectional view illustrating the manufacturing process of the magnetic recording head according to the third embodiment.
Figure 7C:
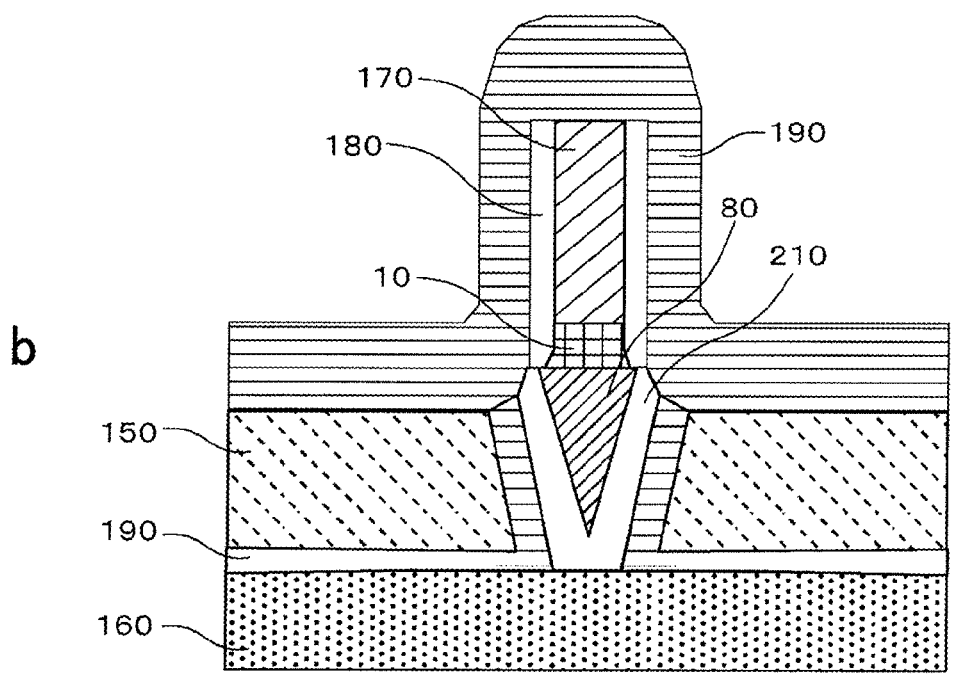
Figure 7D:
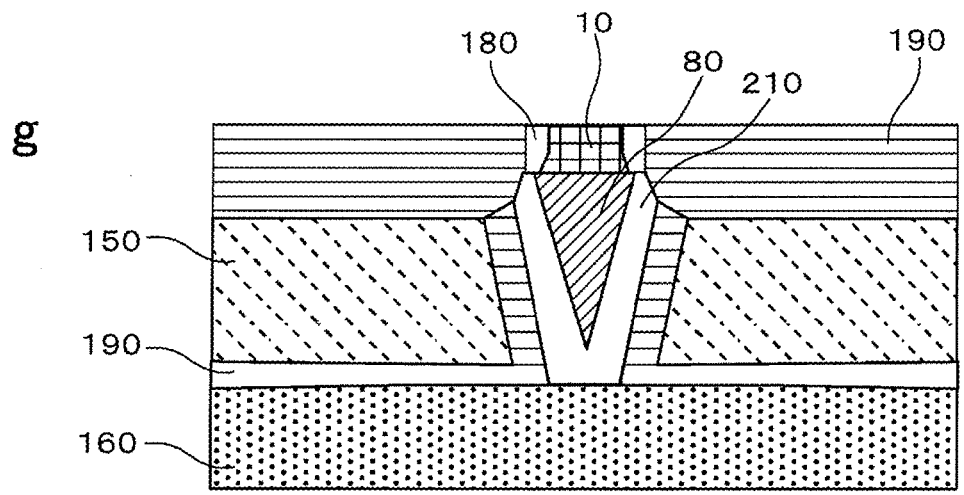
FIG. 7D is a cross-sectional view illustrating the manufacturing process of the magnetic recording head according to the third embodiment.
Figure 7D:
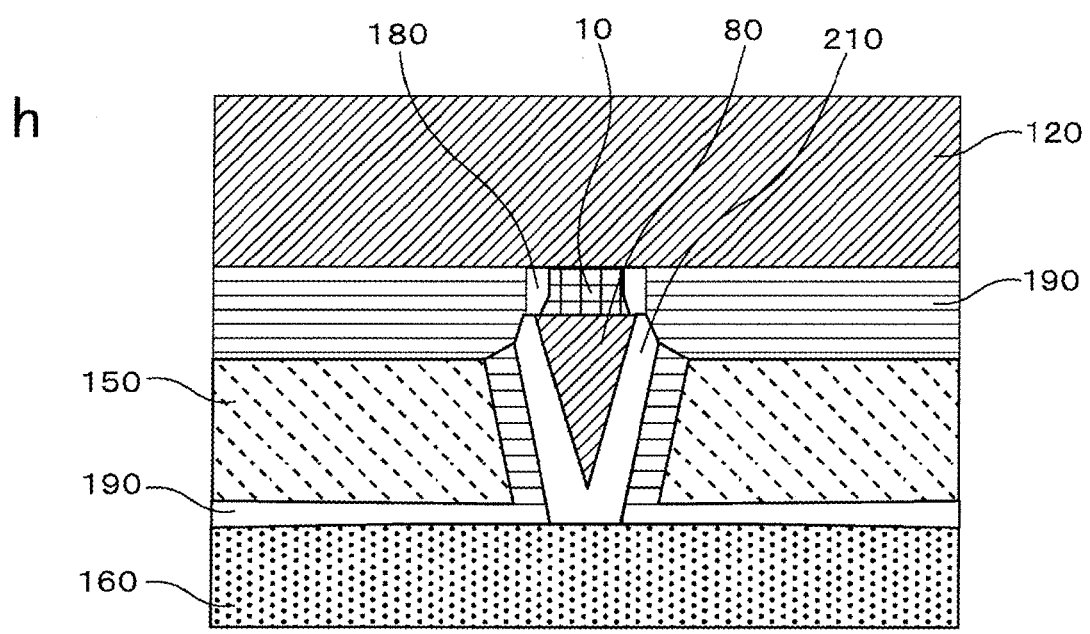

To be specific, the layer of a spin torque oscillator 10 is formed by sputtering on a damascene main-pole trench width adjusting film 210 and a main pole 80 that is somewhat widely formed by the damascene process (FIGS. 7A(a) and 7A(b)). Then, an etching mask 170 is formed to etch the layer of the spin torque oscillator (FIG. 7B(c)). After that, a protective film 180 is formed thereon and then is etched to a certain point of the main pole 80 such that the width of the main pole is partially aligned directly under the spin torque oscillator 10 (FIG. 7C(e)). This configuration makes it possible to form, without causing an offset, the track widths of the main pole for effectively generating a recording magnetic field to a medium and the part of the spin torque oscillator. After that, the spin torque oscillator is covered with an insulating film or the like (FIG. 7C(f)) and then the etching mask is peeled off (FIG. 7D(g)). Finally, a trailing shield is formed (FIG. 7D(h)), so that a track is formed for the damascene main pole. Formation in a Stripe Height direction can be achieved as in the first embodiment.

Fourth Embodiment

Figure 8:
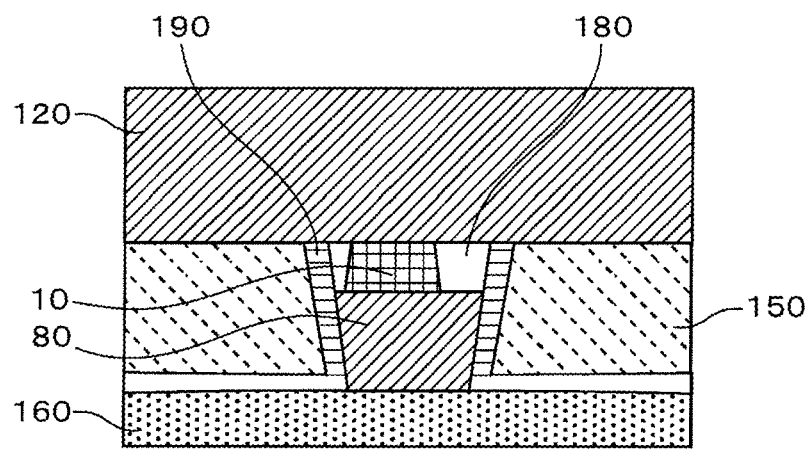
FIG. 8 is a cross-sectional view illustrating the manufacturing process of a magnetic recording head according to a fourth embodiment.

FIG. 8 is a cross-sectional view taken along a track direction to illustrate laterally asymmetrical formation in a manufacturing process of a magnetic recording head. The deposition conditions of a protective film/second etching mask are changed for a shingled recording scheme.

In the formation of the spin torque oscillator in the track direction, the deposition angle of a protective film may be adjusted to form the recording head including a spin torque oscillator for laterally asymmetric Shingle recording. In this case, the total width of the protective film and the spin torque oscillator is kept constant relative to the width of a main pole but the positional relationship of the spin torque oscillator and the main pole is changed.

Fifth Embodiment

Figure 9:
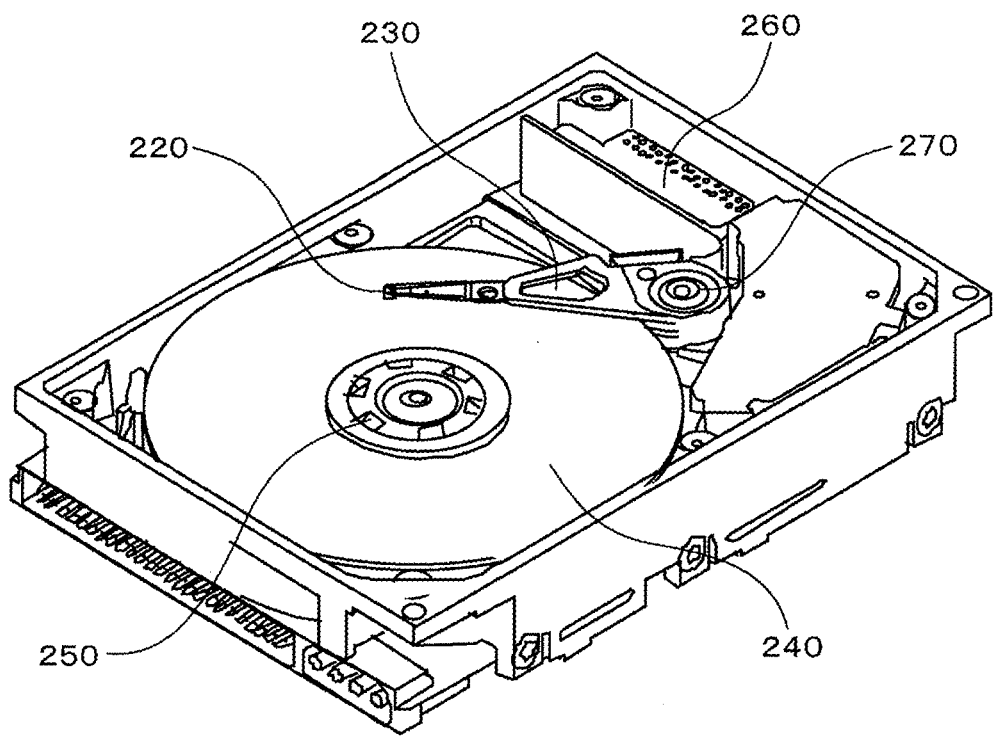
FIG. 9 is a perspective view illustrating the overall configuration of a magnetic disk unit according to the embodiment.

FIG. 9 illustrates a magnetic disk unit including the magnetic recording head formed according to the embodiments. In FIG. 9, reference numeral 220 denotes a magnetic recording/reproducing separation-type magnetic head including a spin torque oscillator 10, reference numeral 230 denotes an arm having the magnetic head 220 on the end of the arm, reference numeral 240 denotes a magnetic disk (magnetic recording medium), reference numeral 250 denotes a spindle motor that rotates the magnetic disk, reference numeral 260 denotes a signal processing circuit that processes a magnetic recording/reproducing signal, and reference numeral 270 denotes a voice coil motor that pivots the arm 220.

The magnetic head 220 including the spin torque oscillator 10 according to the embodiment of the present invention locally facilitates magnetization with the assist effect of microwaves, achieving a higher recording density.

The above explanation describes the preferred embodiments of the present invention. According to the embodiments of the present invention, it is possible to form, as a recording head for Shingle recording, a recording head including the spin torque oscillator 10 with a laterally asymmetrical shape depending upon an angle for sputtering the protective film.

What is claimed is:

1. A magnetic recording head used for microwave-assisted recording, the magnetic recording head comprising:
    a main pole;
    a spin torque oscillator that is disposed on the main pole and includes a magnetization high-speed rotation layer for rotating magnetization at a high speed by a spin torque;
    a protective film that is disposed in a track width direction of the spin torque oscillator;
    an insulating film formed over wall surfaces of the main pole and wall surfaces of the protective film; and
    a magnetic film formed on the insulating film so as to cover at least the main pole.

2. The magnetic recording head according to claim 1, wherein the magnetic film is formed on the insulating film so as to cover the protective film formed on the spin torque oscillator and the main pole.

3. The magnetic recording head according to claim 2, wherein the protective film and the insulating film around the spin torque oscillator have a thickness (gap thickness) larger than a thickness (gap thickness) of the insulating film formed around the main pole.

4. The magnetic recording head according to claim 3, wherein the thickness of the protective film and the insulating film around the spin torque oscillator is at least 5 nm.

5. The magnetic recording head according to claim 1, wherein the spin torque oscillator includes an FGL layer having a width of TWfgl in a track direction, the protective film disposed in the track direction of the FGL layer has a total width of TWins on both sides of the protective film, the main pole directly under the protective film has a width of TWmp in the track direction, the FGL layer and the magnetic film are separated by a distance of GAPfgl in the track direction, a main pole end directly under the protective film and the magnetic film are separated by a distance of GAPmp in the track direction, the total width of TWfgl and TWins has a center position of Csw, TWmp has a center position of Cm, and in this case, Csw and Cm are located substantially on the same line in a thickness direction (main pole–FGL layer direction) and a relationship of GAPfgl>GAPmp is satisfied.

6. The magnetic recording head according to claim 1, wherein in the case where the magnetic film includes a side shield magnetic film formed in the track direction on sides of the main pole and the spin torque oscillator and a trailing shield magnetic film formed on the spin torque oscillator, the side shield magnetic film has an end that is substantially aligned with the end of the main pole in the thickness direction.

7. The magnetic recording head according to claim 1, wherein the protective film laterally formed in the track width direction of the spin torque oscillator has a laterally asymmetric thickness in the track width direction.

8. The magnetic recording head according to claim 1, wherein the protective film disposed in the track width direction of the spin torque oscillator includes one of a single layer film and a laminated film that are made of materials such as Al2O3, SiO2, and SiN.

9. A magnetic disk unit that writes information on a rotating magnetic disk while moving a magnetic head in a predetermined direction,
    the magnetic head being used for microwave-assisted recording, the magnetic recording head including:
    a main pole;
    a spin torque oscillator that is disposed on the main pole and includes a magnetization high-speed rotation layer for rotating magnetization at a high speed by a spin torque;
    a protective film that is disposed in a track width direction of the spin torque oscillator;
    an insulating film formed over wall surfaces of the main pole and wall surfaces of the protective film; and
    a magnetic film formed on the insulating film so as to cover at least the main pole.

10. The magnetic disk unit according to claim 9, wherein the magnetic film is formed on the insulating film so as to cover the protective film formed on the spin torque oscillator and the main pole.

11. The magnetic disk unit according to claim 10, wherein the protective film and the insulating film around the spin torque oscillator have a thickness (gap thickness) larger than a thickness (gap thickness) of the insulating film formed around the main pole.

12. The magnetic disk unit according to claim 11, wherein the thickness of the protective film and the insulating film around the spin torque oscillator is at least 5 nm.

13. A method of manufacturing a magnetic recording head, comprising:
    a track forming step including:
    forming a spin torque oscillator on a main pole;
    etching the spin torque oscillator with an etching mask formed for track formation on the spin torque oscillator;
    forming a protective film protecting ends of the spin torque oscillator while keeping the etching mask;
    etching the main pole by using the etching mask for track formation and the protective film serving as an etching mask;
    forming an insulating film that insulates the main pole and the spin torque oscillator; and
    forming a magnetic film by applying a coating around the insulating film by plating;
    a Stripe Height forming step including:
    forming an etching mask for Stripe Height formation to etch the spin torque oscillator;
    filling an etched part with an insulating film; and
    removing the mask used for etching; and
    forming a magnetic film/upper electrode film for the spin torque oscillator by applying a coating to the spin torque oscillator by plating after the track formation and the Stripe Height formation.

14. The method of manufacturing a magnetic recording head according to claim 13, wherein the magnetic film is formed on the insulating film so as to cover the protective film formed on the spin torque oscillator and the main pole.

15. The method of manufacturing a magnetic recording head according to claim 14, wherein the protective film and the insulating film around the spin torque oscillator have a thickness (gap thickness) larger than a thickness (gap thickness) of the insulating film formed around the main pole.

16. The method of manufacturing a magnetic recording head according to claim 15, wherein the thickness of the protective film and the insulating film around the spin torque oscillator is at least 5 nm.

17. The method of manufacturing a magnetic recording head according to claim 13, wherein the spin torque oscillator includes an FGL layer having a width of TWfgl in a track direction, the protective film disposed in the track direction of the FGL layer has a total width of TWins on both sides of the protective film, the main pole directly under the protective film has a width of TWmp in the track direction, the FGL layer and the magnetic film are separated by a distance of GAPfgl in the track direction, a main pole end directly under the protective film and the magnetic film are separated by a distance of GAPmp in the track direction, the total width of TWfgl and TWins has a center position of Csw, TWmp has a center position of Cm, and in this case, Csw and Cm are located substantially on the same line in a thickness direction (main pole–FGL layer direction) and a relationship of GAPfgl>GAPmp is satisfied.

18. The method of manufacturing a magnetic recording head according to claim 13, wherein in the case where the magnetic film includes a side shield magnetic film formed in the track direction on sides of the main pole and the spin torque oscillator and a trailing shield magnetic film formed on the spin torque oscillator, the side shield magnetic film has an end that is substantially aligned with the end of the main pole in the thickness direction.

19. The method of manufacturing a magnetic recording head according to claim 13, wherein the protective film laterally formed in the track width direction of the spin torque oscillator has a laterally asymmetric thickness in the track width direction.

20. The method of manufacturing a magnetic recording head according to claim 13, wherein the protective film disposed in the track width direction of the spin torque oscillator includes one of a single layer film and a laminated film that are made of materials such as Al2O3, SiO2, and SiN.

* * * * *